United States Patent
Kobayashi (10) Patent No.: US 8,248,442 B2
(45) Date of Patent: Aug. 21, 2012

(54) APPARATUS AND METHOD FOR SIDE DETERMINATION OF OPTICAL DISC

(75) Inventor: Nobutsune Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 12/434,186

(22) Filed: May 1, 2009

(65) Prior Publication Data

US 2009/0278909 A1 Nov. 12, 2009

(30) Foreign Application Priority Data

May 7, 2008 (JP) ................................. 2008-120881

(51) Int. Cl.
*B41J 2/435* (2006.01)
*G11B 20/00* (2006.01)
(52) U.S. Cl. .................................... 347/224; 369/53.44
(58) Field of Classification Search .................. 347/224, 347/225; 369/53.23, 44.26, 53.22–53.24, 369/120, 53.41, 53.44
See application file for complete search history.

(56) References Cited

U.S. PATENT DOCUMENTS

| 7,483,174 B2 * | 1/2009 | Tadas | 358/1.9 |
| 7,646,691 B2 * | 1/2010 | Morishima | 369/53.23 |
| 2007/0109601 A1 | 5/2007 | Mitani | 358/1.18 |

FOREIGN PATENT DOCUMENTS

| JP | 59-72682 | 4/1984 |
| JP | 7-32742 | 6/1995 |
| JP | 10-112068 | 4/1998 |
| JP | 2002-42382 | 2/2002 |
| JP | 2002042382 A * | 2/2002 |
| JP | 2004-079012 A | 3/2004 |
| JP | 2006-279570 | 10/2006 |
| JP | 2006-286072 | 10/2006 |
| JP | 2007-18608 | 1/2007 |
| JP | 2007-141321 | 6/2007 |
| JP | 2007-280484 | 10/2007 |

* cited by examiner

*Primary Examiner* — Hai C Pham
(74) *Attorney, Agent, or Firm* — Fitzpatrick, Cella, Harper & Scinto (57) ABSTRACT

A side determination apparatus of an optical disc includes a light source illuminating one side of the optical disc having a data side and a non-data side obliquely; a sensor receiving a reflected light from the optical disc illuminated by the light source; and a determination unit determining that an incident light into the sensor is a reflected diffracted light from the data side of the optical disc based on a distribution of an output of the sensor onto a surface of the disc to determine the one side.

12 Claims, 8 Drawing Sheets

SUB-SCAN DIRECTION

SUB-SCAN DIRECTION

SUB-SCAN DIRECTION

SUB-SCAN DIRECTION

APPARATUS AND METHOD FOR SIDE DETERMINATION OF OPTICAL DISC

BACKGROUND OF THE INVENTION

1. Field of the Invention

The present invention relates to a determination apparatus for identifying the data side and non-data side of an optical disc, and an image reading apparatus, printer and multifunction peripheral using the determination apparatus.

2. Description of the Related Art

An optical disc, such as a compact disc (CD), a digital versatile disc (DVD), and a Blu-ray disc (BD), has a data side, from which data is read, and a non-data side, on which a label image is recorded. Moreover, a CD recordable (CD-R), a DVD recordable (DVD-R), a BD recordable (BD-R), and the like, can record data on their data sides and can print label images on their non-data sides.

There has been a technique for printing a bar code pattern on a non-data side of a disc for the identification of the data side and the non-data side thereof. Moreover, there has been another technique for enabling the identification of a data side of a disc by measuring the thickness of the layer in which data is recorded from the surface of the data side.

Both the techniques need complicated apparatus, such as a specific recognition apparatus of the bar code pattern and a thickness measuring instrument. An apparatus that is not a reading apparatus of the data of an optical disc bears a large burden when the apparatus handles an optical disc. Consequently, an image reading apparatus and a printer have had a problem in which, when a user mistakes the front side and back side of an optical disc and arranges the optical disc, the image reading apparatus and the printer perform image reading and printing, respectively, without turning up the erroneously arranged disc.

SUMMARY OF THE INVENTION

An aspect of the present invention is a side determination apparatus of an optical disc, comprising: a light source illuminating one side of the optical disc having a data side and a non-data side obliquely; a sensor receiving a reflected light from the optical disc illuminated by the light source; and a determination unit determining that an incident light into the sensor is a reflected diffracted light from the data side of the optical disc based on a distribution of an output of the sensor onto a surface of the disc to determine the one side.

Further features of the present invention will become apparent from the following description of exemplary embodiments with reference to the attached drawings.

DESCRIPTION OF THE EMBODIMENTS

Embodiment 1

Figure 10:
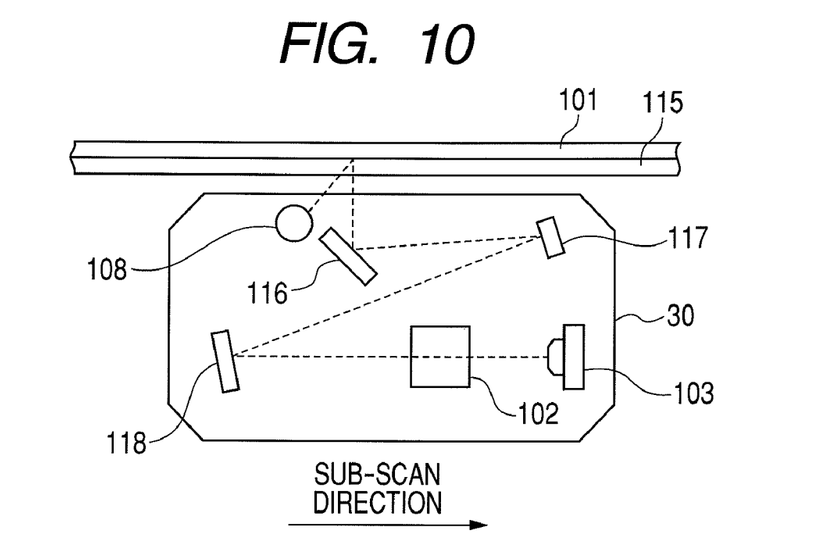
FIG. 10 is a sectional view illustrating the sensor unit of the image reading apparatus and an original.

FIG. 10 is a sectional view illustrating a positional relation between a sensor unit 30 of an image reading apparatus to which the present invention is applied and an original 101. The original 101 placed on an original table glass plate 115 is illuminated by a light source 108 of a cold cathode fluorescent lamp (CCFL) obliquely from the lower left direction. A light reflected on the original 101 is reflected on mirrors 116, 117, and 118 in order, and then forms an image on a charge coupled device (CCD) line sensor 103 with a lens 102. The direction perpendicular to the drawing is the main-scan direction, and the direction of a scan from the left to the right of the drawing is the sub-scan direction. The sensor unit 30 mounted with the light source 108, the mirrors 116, 117, and 118, the lens 102, and the CCD line sensor 103 scans the original 101 into the sub-scan direction.

Figure 9:
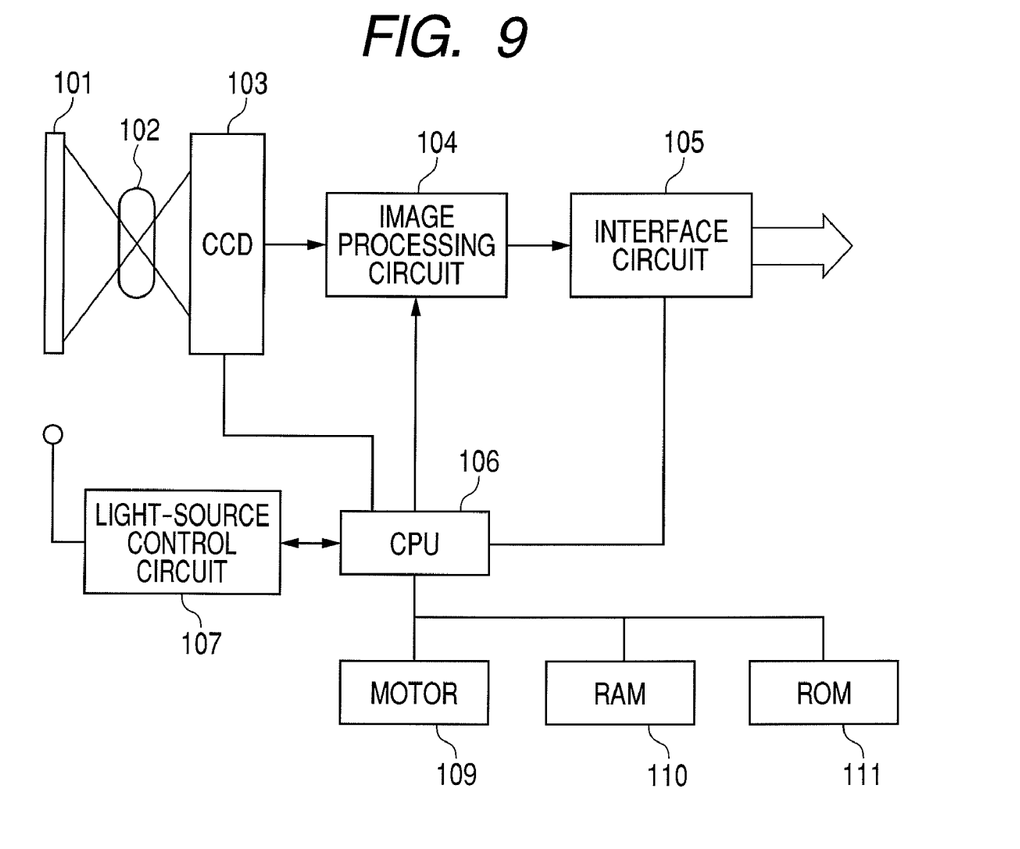
FIG. 9 is a block diagram of an image reading apparatus.

FIG. 9 illustrates a block diagram of an image reading apparatus 100, to which the present invention is applied. The image reading apparatus 100 includes the lens 102; the light receiving element 103 of the CCD line sensor, which converts an image formed by the lens 102 into an electric signal; an image processing circuit 104, which converts a read signal into a digital signal to process the converted digital signal; an interface circuit 105 to be used for the communication with external equipment, which interface circuit 105 communicates a processed image signal and a control signal of the image reading apparatus 100; a light-source control circuit 107 controlling the light source 108; a central processing unit (CPU) 106; a random access memory (RAM) 110; and a read only memory (ROM) 111; and a stepping motor 109 for moving the sensor unit 30, which includes the lens 102, the light receiving element 103, the light source 108, and the other optical systems, into the sub-scan direction. The CPU 106, RAM 110 and ROM 111 perform the control of reading.

Figure 1A:
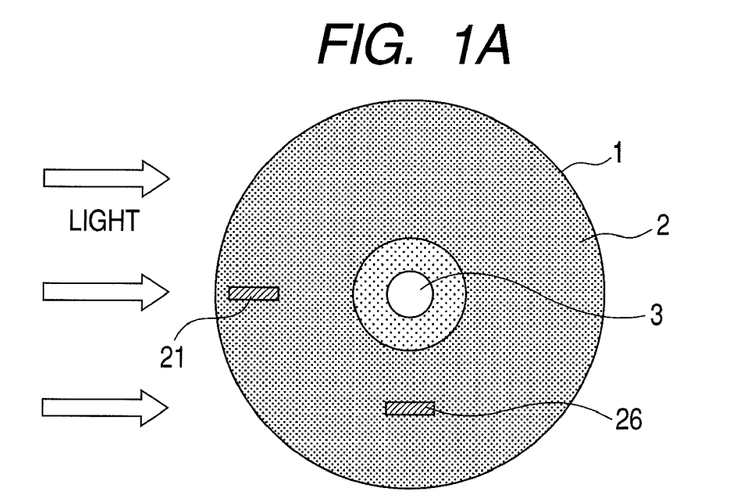
FIG. 1A is a view illustrating an optical disc 1.
Figure 1B:
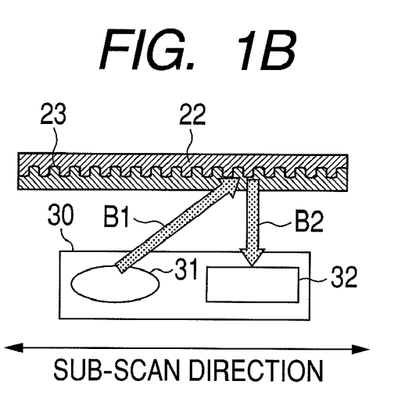
FIG. 1B is a view illustrating a light diffracted and reflected on the data side of the optical disc 1 to enter a light receiving element.

In the following, a front/back side determination apparatus of a circular optical disc, which front/back side determination apparatus is provided with an image reading unit equipped with a light receiving unit and a light emitting unit, will be described. Because the front/back side determination apparatus is an apparatus handling the image information on a label side, it is supposed in the following that a non-data side, which is the label side, is the front side and a data side is the back side. FIG. 1A is a plan view of an optical disc 1. The optical disc 1 has an information data recording side 2 and a hole 3 for holding the disc 1 with a driving side. An illuminating light obliquely irradiates the optical disc 1 from the front side on the left side of the paper surface. FIG. 1B is a sectional view illustrating a region 21 extending into a radial direction of the optical disc 1 in an enlarged manner. A substrate 22 is a substrate of the disc 1, which substrate 22 is made of a polycarbonate resin or the like. A recording film layer 23 is a recording film layer formed of aluminum or the like. The recording film layer 23 includes lands, which are flat surface portions, and pits, which are projecting portions and form a train to form a track in a spiral. The shape of the track are wavelike as illustrated in FIG. 1B when the disc 1 is cut in a radial direction. FIG. 1B illustrates the state in which a light B1 emitted from the light source 31 of the sensor unit 30 is reflected on the recording film layer 23 to reach a light receiving portion 32. The light source 31 is made up of a CCFL, and the light receiving portion 32 is made up of a mirror, a lens, and a CCD line sensor. In FIG. 1B, the light B1 irradiates the portion of the recording film layer 23 from the direction perpendicular to the groove directions of the wavelike shape of the track. A light B2 diffracted and reflected by the wavelike shape consequently reaches the light receiving portion 32.

Figure 1C:
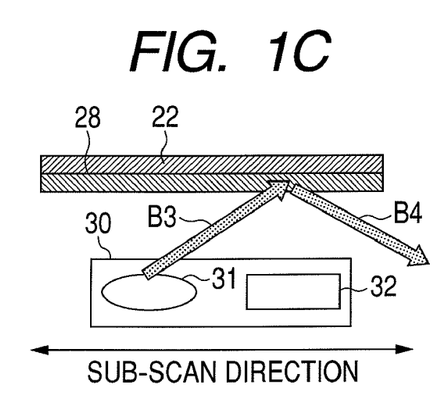
FIG. 1C is a view illustrating a light reflected on the data side of the optical disc 1 not to enter the light receiving element.

FIG. 1C is a sectional view illustrating a region 26 extending into a circumferential direction of the optical disc 1 in an enlarged manner. The region 26 extending into the circumferential direction includes the substrate 22 and a recording film layer 28. In the sectional view illustrate in FIG. 1C, no wavelike shape of the track appear in the recording film layer 28, and the recording film layer 28 is in the shape of a flat surface. A light B3 emitted from the light source 31 is reflected on the recording film layer 28, and the reflected light B4 does not reach the light receiving portion 32.

Figure 1D:
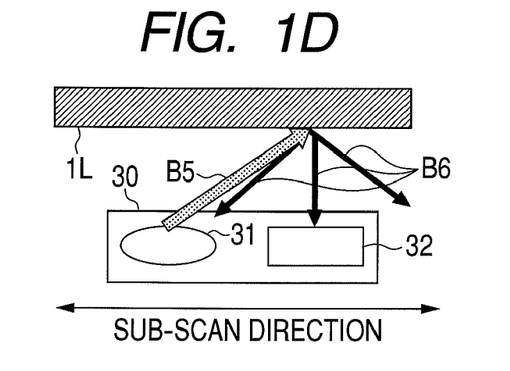
FIG. 1D is a view illustrating a light reflected diffusely on the non-data side 1L of the optical disc 1 to enter the light receiving element.

FIG. 1D is a view illustrating the paths of lights when the sensor unit 30 tries to read the label side 1L of the optical disc 1. If the printed label side 1L is not a mirror surface but some characters and images are described, then a light B5 generated by the light source 31 is reflected by the printed label side 1L to be a diffused light B6, and only a part of the diffused light B6 reaches the light receiving portion 32.

In comparison with the case of the image reading of a general reflecting original sheet, as is illustrated in FIG. 1D, the light reaching the light receiving portion 32 is extremely bright in the case illustrated in FIG. 1B, and the light reaching the light receiving portion 32 is extremely dark in the case illustrated in FIG. 1C.

Because the light reaching the light receiving portion 32 is brighter than that of the case of scanning a pure-white reflecting original (called as a white reference generally) in the case illustrated in FIG. 1B, the input values into the light receiving portion 32 concentrate to white in an image reading apparatus in which white reference corrections are performed. The case where an incident light is reflected by the track in a solid shape and all the input values into the light receiving portion 32 concentrate to the white as described above is a peculiar phenomenon, and the possibility of the occurrence of such case is low even in the case of the pure-white reflecting original. Consequently, the case of FIG. 1B is sufficient to be a basis for specifying the back side (recording side) of the optical disc 1.

Since the light reaching the light receiving portion 32 becomes as dark as that in the case of performing scanning in the state in which no lights exist (called as a black reference generally) in the case illustrated in FIG. 1C, almost all input values into the light receiving portion 32 concentrate to black in an image reading apparatus in which black reference corrections are performed. It can be considered that the light reaching the light receiving portion 32 becomes subtly bright owing to the influences of the track formed in a subtly curved shape in the case illustrated in FIG. 1C differently from a black reference value to be obtained by putting out the light source 31. However, such a dark input value is generated as a peculiar phenomenon in the case where a light is reflected by a track in the shape of a flat surface. Consequently the case of FIG. 1C is sufficient as the basis for specifying the back side (recording side) of the optical disc 1.

Figure 2:
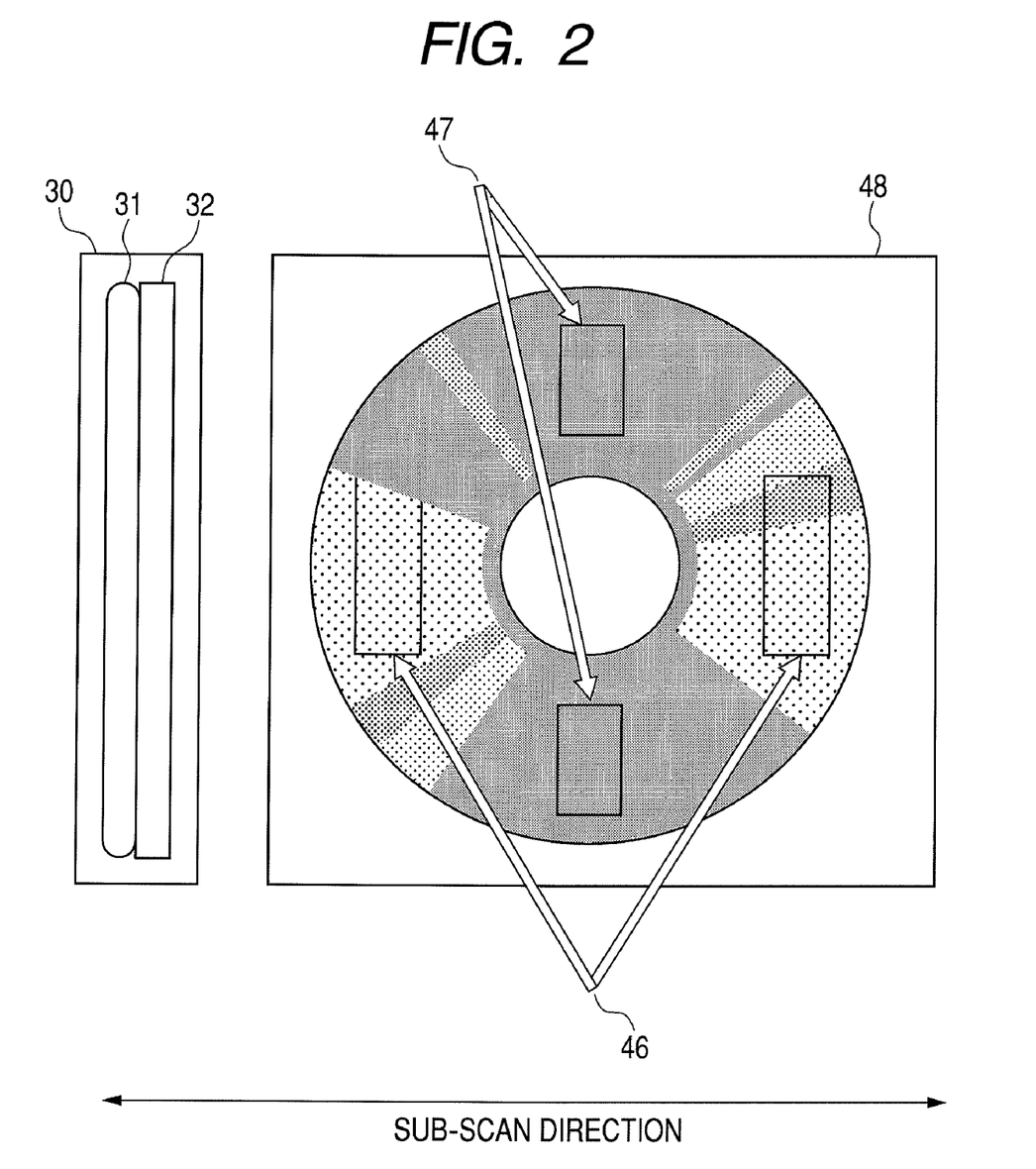
FIG. 2 is a view illustrating an actual image in the case of adopting a cold cathode fluorescent lamp (CCFL) 108 and a diffuser panel as a light source 31 in an embodiment 1 of the present invention.

FIG. 2 is a view illustrating an actual image 48 in the case of adopting a cold cathode fluorescent lamp (CCFL) and a diffuser panel as the light source 31 in an embodiment 1 of the present invention. In the actual image 48, an image is very bright in areas 46 in each of which the cross section of the optical disc 1 in a radial direction is parallel to the sub-scan direction of the sensor unit 30 as described with reference to FIG. 1B. On the other hand, an image is very dark in areas 47, each of which is parallel to the cross section of the optical disc 1 in a circumferential direction as described with reference to FIG. 1C.

Figure 3A:
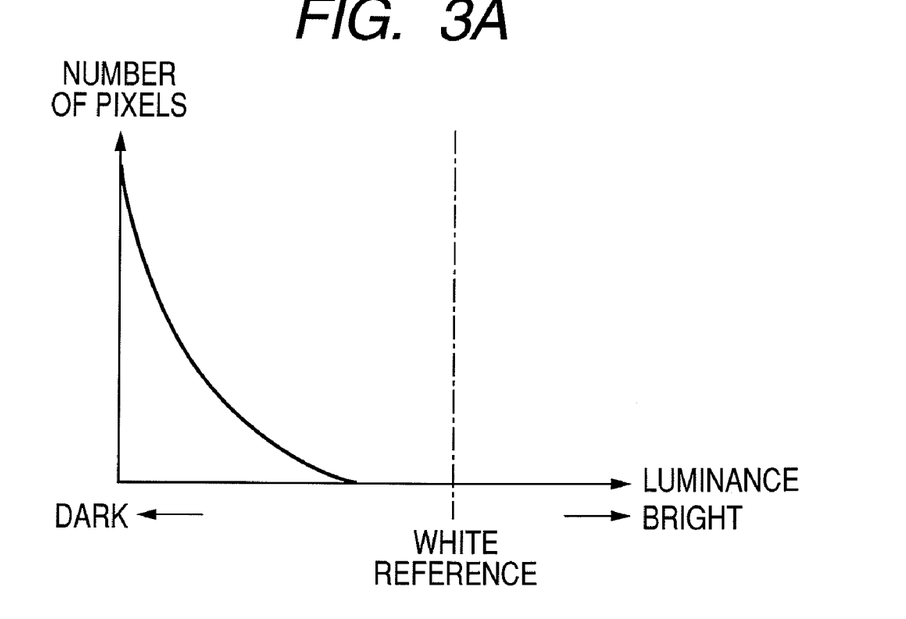
FIG. 3A is a graph illustrating a histogram of an area 47 simply.
Figure 3B:
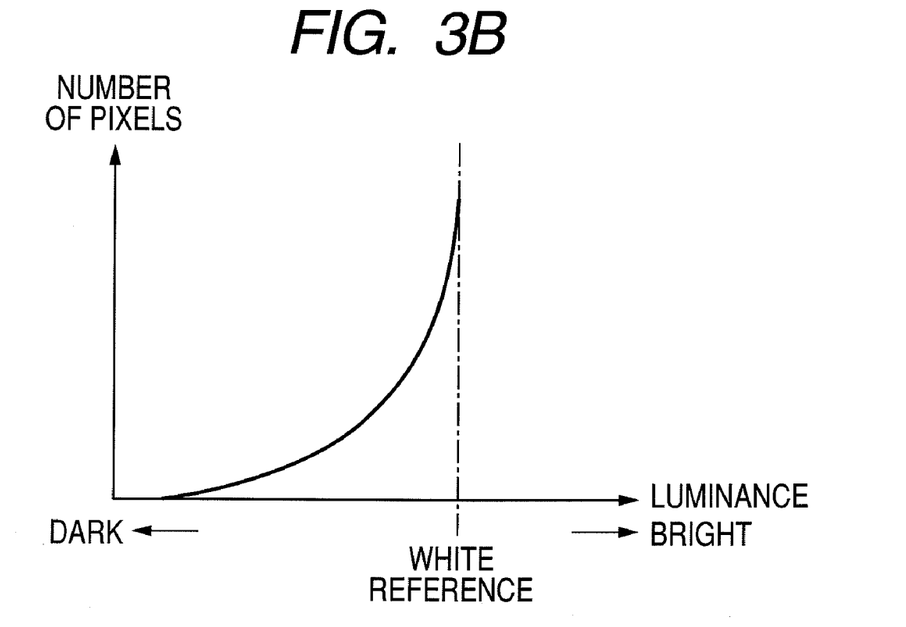
FIG. 3B is a graph illustrating a histogram of an area 46 simply.

FIG. 3A is a graph illustrating a histogram in one of the areas 47 simply, and the histogram illustrates that the number of the pixels concentrating onto the dark side is very large. FIG. 3B is a graph illustrating a histogram in one of the areas 46 simply, and the histogram illustrates that the number of the pixels concentrating onto the white reference side is very large.

Figure 4:
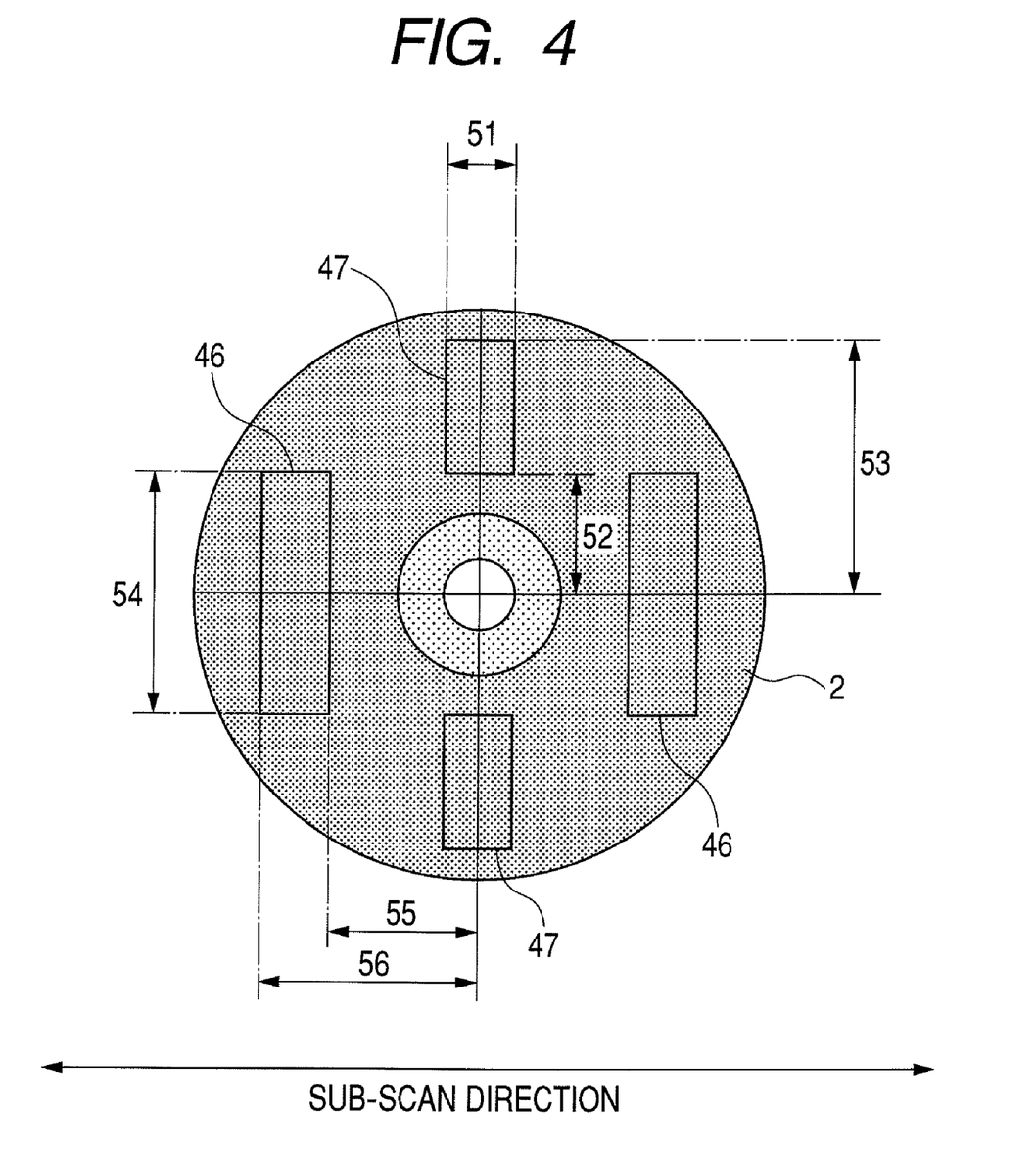
FIG. 4 is a view illustrating positional relations among a sub-scan direction, areas 46, and areas 47 at the time of reading an image on the back side (recording side) of the circular optical disc 1 with a sensor unit 30.

FIG. 4 is a view illustrating positional relations among the sub-scan direction, the areas 46, and the areas 47 at the time of reading the image on the back side (recording side) of the circular optical disc 1 with the sensor unit 30. The whole area of the optical disc 1 may be set as the areas 46, which are detection object regions of the image data exceeding predetermined luminance.

However, it is desirable to set the region of a suitable width 54 as each of the areas 46 of the detection object regions of the pixel data having luminance exceeding the predetermined luminance. The region of the suitable width 54 exists in a range of from a suitable distance 55 to a distance 56, both inclusive, from the center of the optical disc 1 as the starting point, facing the sub-scan direction of the sensor unit 30. By adjusting the width 54 and the distances 55 and 56, a sufficient detection performance can be realized and the number of the pixels of determination objects can be decreased to enable the decrease of a processing load with the consideration of the mechanical and electrical device tolerances of the optical disc 1 and the sensor unit 30.

A suitable width 51 is set as each of the areas 47 of the detection object regions of the pixel data having luminance less than the predetermined luminance. The region of the suitable width 51 exists in a range of from a suitable distance 52 to a distance 53, both inclusive, from the center of the optical disc 1 as the starting point, facing the direction perpendicular to the sub-scan direction of the sensor unit 30. By adjusting the width 51 and the distances 52 and 53, a sufficient detection performance can be realized and the number of the pixels of determination objects can be decreased to enable the decrease of a processing load with the consideration of the mechanical and electrical device tolerances of the optical disc 1 and the sensor unit 30.

Figure 5:
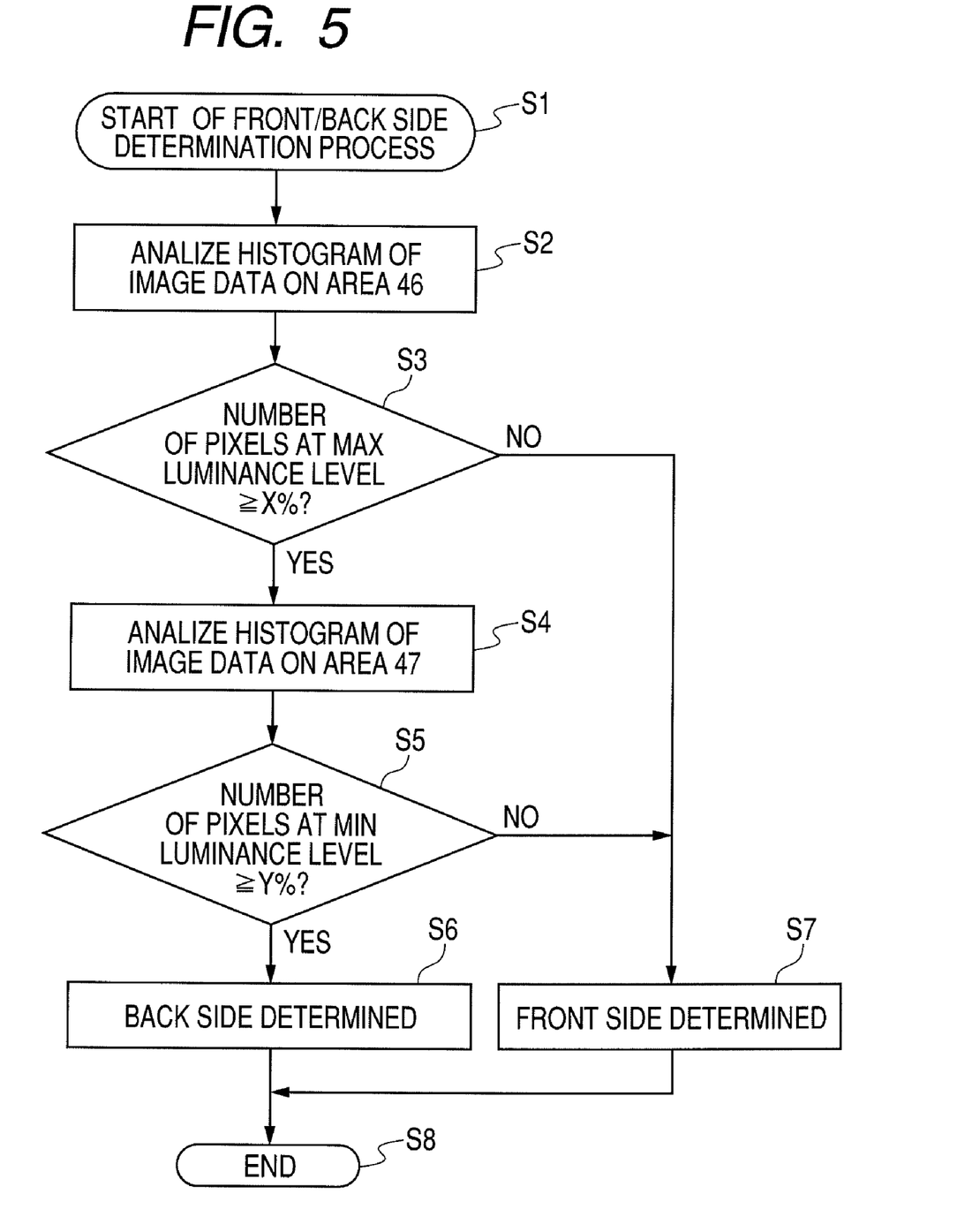
FIG. 5 is a flow chart illustrating the operation of determining the front side and back side of the optical disc 1 in the embodiment 1.

FIG. 5 is a flow chart illustrating the operation of determining the front side and back side of the optical disc 1 in the embodiment 1. In the case of the image reading apparatus illustrated in FIG. 9, the operation is executed by the external equipment connected to the image reading apparatus through the interface circuit 105 to process the image signal on the surface of the optical disc 1. When the front/back side determination process starts at Step S1, the histogram of the image data in each of the areas 46 is analyzed at Step S2, and it is determined whether a rate of the pixels concentrating at the maximum luminance is equal to or more than a predetermined rate X %, or not at Step S3. A suitable value based on the consideration of the tolerance of a system to be applied is desirably adopted as the rate X %. If the number of the pixels concentrating at the maximum luminance is less than the rate X %, then it is determined that the image data indicates the front side surface (label side 1L) at Step S7, and the process is ended at Step S8.

If a rate of the pixels concentrating at the maximum luminance is equal to or more than the rate X %, then the histogram in each of the areas 47 is analyzed at Step S4, and it is determined whether a rate of the pixels concentrating at the minimum luminance is equal to or more than a predetermined rate Y %, or not at Step S5. A suitable value based on the consideration of the tolerance of the system to be applied is desirably adopted as the rate Y %. If the number of the pixels concentrating at the minimum luminance is less than the rate Y %, then it is determined that the image data is that existing on the front side surface (label side 1L) at Step S7, and the process is ended at Step S8. If a rate of the pixels concentrating at the minimum luminance is equal to or more than the rate Y %, then it is determined that the image data indicates the back side surface (recording side) at Step S6, and the process can be ended at Step S8.

Incidentally, a detection unit is provided at the subsequent stage of the light receiving portion 32. The detection unit detects the existence of a predetermined number or more of pieces of pixel data having luminance exceeding the predetermined luminance in a predetermined region of the image data read from the circular optical disc 1 by the image reading unit. Moreover, a determination unit is provided at the subsequent stage of the detection unit. The determination unit determines that the image of the read image data is the image on the recording side of the circular optical disc 1 when the predetermined number or more of pieces of the pixel data having luminance exceeding the predetermined luminance exist. Furthermore, another detection unit is provided at the subsequent stage of the light receiving portion 32. The detection unit detects the existence of a predetermined number or more of pieces of pixel data having luminance less than the predetermined luminance in the predetermined region of the image data read from the circular optical disc 1 by the image reading unit. Moreover, another determination unit is provided at the subsequent stage of the latter detection unit. The determination unit determines that the image of the read image data is the image on the recording side of the circular optical disc 1 when the predetermined number or more of pieces of the pixel data having luminance less than the predetermined luminance exist.

Embodiment 2

Figure 6:
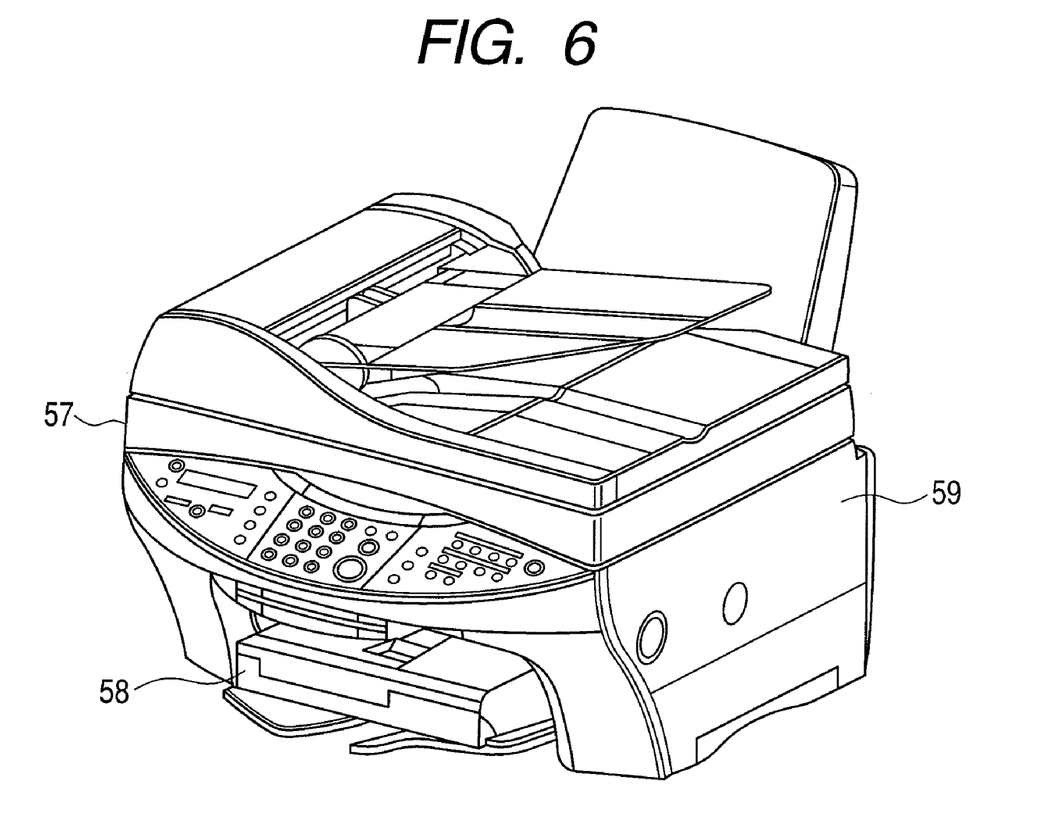
FIG. 6 is a view illustrating the external appearance of a multifunction peripheral 200 equipped with a front/back side determination apparatus of an optical disc, which is an embodiment 2 of the present invention.
Figure 7:
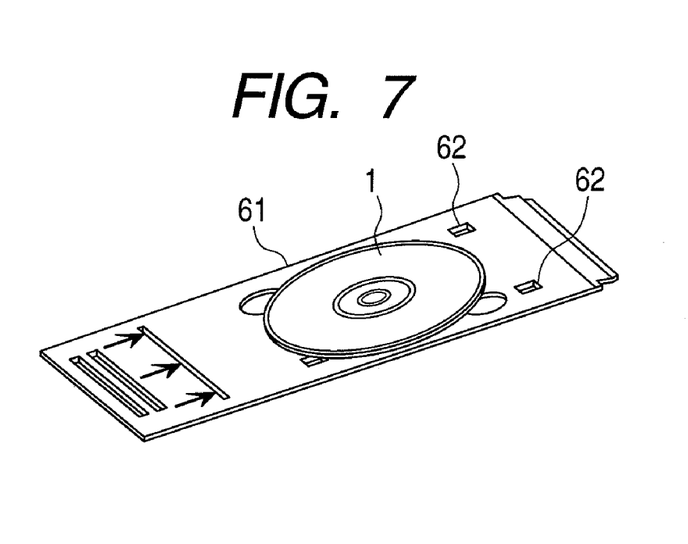
FIG. 7 is a perspective view illustrating the state of placing the optical disc 1 on a printing tray 61.

FIG. 6 is a view illustrating the external appearance of a multifunction peripheral 200 equipped with a front/back side determination apparatus of an optical disc of an embodiment 2 of the present invention. The multifunction peripheral 200 includes an image reading apparatus 57, a printer apparatus 59, an image processing unit (not illustrated), and a control unit (not illustrated). The multifunction peripheral 200 includes a front/back side determination apparatus of an optical disc as an original to be read by the image reading apparatus 57 and another front/back side determination apparatus of an optical disc mounted on the printer apparatus 59 as a printing medium. The process illustrated in the flow chart of FIG. 5 is executed in the external equipment in the embodiment 1, but the process is executed by the control unit and the image processing unit in the multifunction peripheral 200 of the embodiment 2. A tray guide unit 58 is the one for setting in the optical disc 1 to be a printing medium. A printing tray 61 setting the optical disc 1 therein is mounted in the tray guide unit 58. FIG. 7 is a perspective view illustrating a state of the optical disc 1 as the printing medium to be placed on the printing tray 61.

Figure 8:
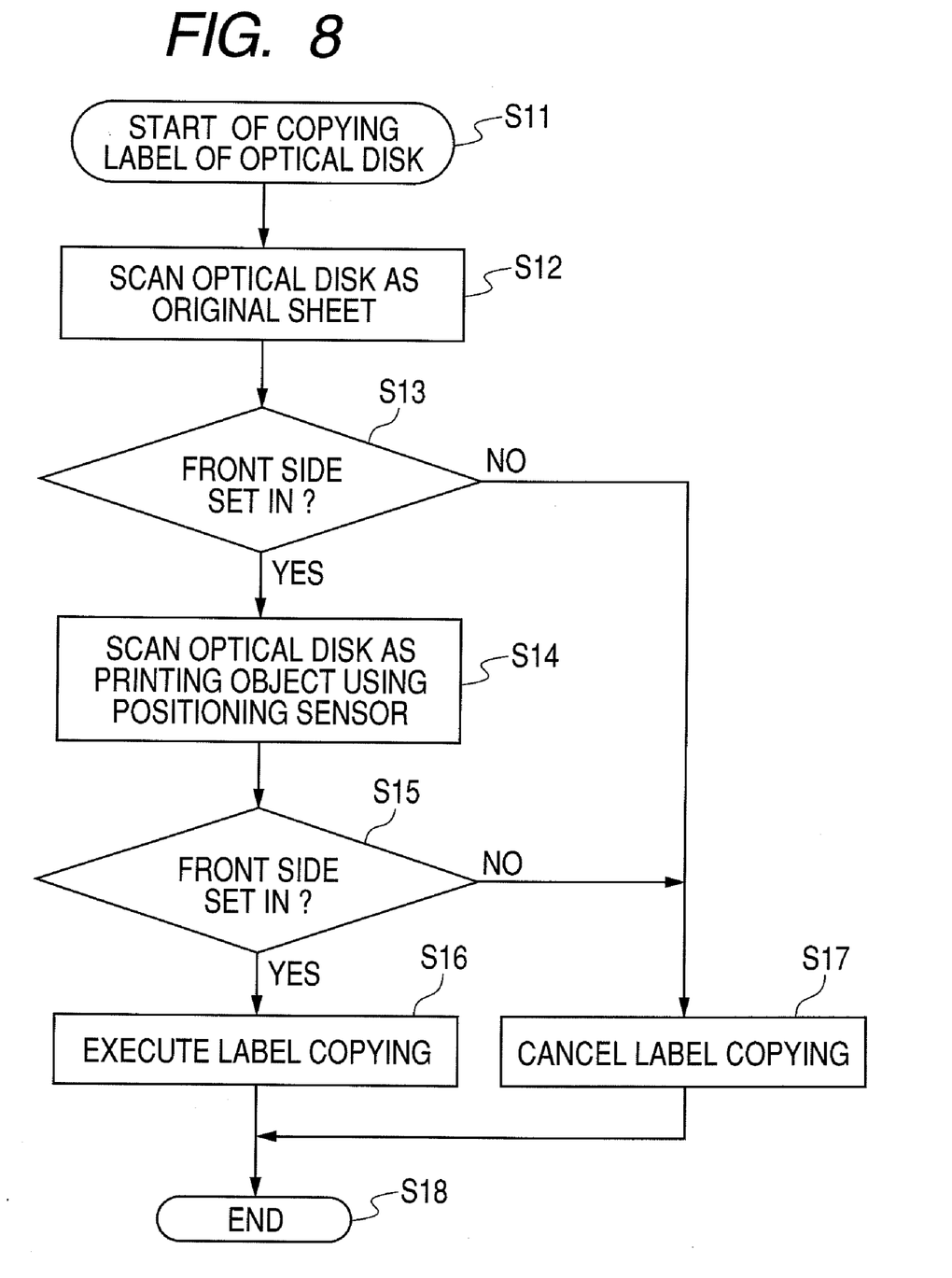
FIG. 8 is a flow chart illustrating a process of the multifunction peripheral 200.

FIG. 8 is a flow chart illustrating a process of the control unit of the multifunction peripheral 200. When an instruction of copying the label of the optical disc 1 is issued at Step S11, the image reading apparatus 57 scans the optical disc 1 as an original at Step S12. If the front/back side determination process of the optical disc 1 described with regard to the embodiment 1 is performed as to the image obtained here and the image is determined not to be the one on the front side surface, then no label copying is performed at Step S17, and the process is ended at Step S18. If the image is determined to be the one on the front side surface at Step S13, then the optical disc 1 to be the printing object is set in the printer apparatus 60 at Step S14, and after that, a positioning sensor of the optical disc 1 in the printer apparatus 60 scans the surface of the optical disc 1. The positioning sensor is configured to illuminate the printing tray 61 and the optical disc 1 obliquely and detect the reflected lights from the printing tray 61 and the optical disc 1, and is attached to the carriage of a print head. By moving the carriage into the main scan direction and by moving the printing tray 61 into the sub-scan direction, the positioning sensor 62 scans the surfaces of the optical disc 1 as the printing object and the printing tray 61. As illustrated in FIG. 7, marks 62 are provided onto the printing tray 61 at predetermined positions to the center of the optical disc 1 to be set in. The center position of the optical disc 1 is calculated from the detection positions of the marks 62, and the position adjustment of the printing image to the optical disc 1 is performed. Moreover, by comparing the quantity of a reflected light with a threshold value at each position (in areas 46 and 47) on the optical disc 1, the front/back side determination is performed similarly to the embodiment 1. The print head is situated on the upper side of the printing medium. If the optical disc 1 as the printing object is determined to be set in so that the back side surface of the optical disc 1 is up here, then no label copying is performed at Step S17, and the process is ended at Step S18. If the optical disc 1 is determined to be set in so that the front side surface thereof is up, label copying is executed at Step S16.

According to the embodiments described above, the apparatus including the sensor unit 30 equipped with the light receiving unit and the light emitting unit can accurately identify the front side and back side of the optical disc 1 without adding any new parts. Moreover, according to the embodiments described above, a user can prevent the multifunction peripheral 200 from performing erroneous copy printing on the back side surface (data side) of the printing optical disc 1.

Moreover, the multifunction peripheral 200 includes an informing unit for calling user's attention when the front side and back side of the optical disc 1 as the original is set in by mistake. Furthermore, the multifunction peripheral 200 includes a copying operation prevention unit for preventing any copying operations. However, the characters of a label are sometimes printed on a transparent protection layer, through which track grooves can be seen, as a design of the optical disc 1. When such an optical disc 1 is read as the original, the copying operation prevention is manually released.

Moreover, when the multifunction peripheral 200 is used as a printing apparatus, the multifunction peripheral 200 includes an informing unit for calling user's attention if the front side and back side of the optical disc 1 as the printing medium are erroneously set in.

Moreover, the multifunction peripheral 200 includes another copying operation prevention unit for preventing any copying operations if the front side and back side of the optical disc 1 as a printing medium are erroneously set in.

Incidentally, if the configurations described above are grasped as processes, the embodiments described above can be grasped as front/back side determination methods of the optical disc 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120881, filed May 7, 2008, which is hereby incorporated by reference herein its entirety.

What is claimed is:

1. A side determination apparatus of an optical disc, comprising:
    a light source illuminating one side of the optical disc obliquely, the optical disc having a data side and a non-data side;
    a plurality of sensors receiving light reflected in a normal direction of the optical disc illuminated by the light source; and
    a determination unit determining that incident light into the plurality of sensors is reflected diffracted light from the data side of the optical disc when:
        a first signal, which is obtained by receiving the reflected diffracted light from a first region situated at a front or back position of a center of the optical disc in a region on the optical disc with respect to a direction of the oblique illumination, indicates luminance exceeding a threshold value, and
        a second signal, which is obtained by receiving the reflected diffracted light from a second region situated at a left or right position of a center of the optical disc in a region on the optical disc with respect to a direction of the oblique illumination, indicates luminance less than a threshold value.

2. An image reading apparatus reading an image of an original placed on an original table, comprising:
    the side determination apparatus according to claim 1, the side determination apparatus mounted on the image reading apparatus to determine a side of an optical disc placed on the original plate table, wherein
    the light source is a linear light source to illuminate the original; and
    the sensor is a line sensor including a plurality of light receiving elements arranged in a line to read the original.

3. The image reading apparatus according to claim 2, wherein the determination unit of the side determination apparatus mounted on the image reading apparatus determines existence of a predetermined number or more pixels larger than a predetermined value based on image data read with the line sensor in a first region situated at a front or back position of a center of the optical disc in a region on the optical disc with respect to a direction of the oblique illumination.

4. The image reading apparatus according to claim 2, wherein the determination unit of the side determination apparatus mounted on the image reading apparatus determines existence of a predetermined number or more pixels smaller than a predetermined value based on image data read with the line sensor in a second region situated at a left or right position of a center of the optical disc in a region on the optical disc with respect to a direction of the oblique illumination.

5. The image reading apparatus according to claim 2, further comprising an informing unit for informing a user of an abnormality of placing the optical disc when the determination unit determines the one side as the data side.

6. A copying apparatus mounted with the image reading apparatus according to claim 2, comprising a control unit for prohibiting any starts of copying operations in a state in which the determination unit determines the one side as the data side.

7. The copying apparatus according to claim 6, further comprising a release unit releasing the state in which the determination unit determines the one side as the data side.

8. A printer for printing a label on an optical disc, comprising:
    the side determination apparatus according to claim 1 mounted thereon; and
    an informing unit informing a user of an abnormality of mounting of the optical disc when the determination unit determines that the optical disc is not mounted in a state in which the non-data side thereof faces a printing face side of the printer.

9. The printer according to claim 8, wherein a sensor for detecting a center position of the optical disc is used as the sensor of the side determination apparatus.

10. The printer according to claim 8, further comprising a control unit for prohibiting any starts of printing operations in a state in which the determination unit determines that the optical disc is not mounted in a state in which the non-data side thereof faces the printing face side of the printer.

11. A copying apparatus mounted with the printer according to claim 8, comprising a control unit for prohibiting any starts of copying operations in a state in which the determination unit determines that the optical disc is not mounted in a state in which the non-data side thereof faces the printing face side of the printer.

12. The side determination apparatus according to claim 1, further comprising a moving unit moving the plurality of sensors for scanning relative to the optical disc, wherein the sensors receive, at a position moved for scanning, light reflected from a first region situated at a front or back position of a center of the optical disc.

* * * * *